(12) United States Patent  
Furuta

(10) Patent No.: US 7,660,664 B2
(45) Date of Patent: Feb. 9, 2010

(54) INFORMATION SERVICE SYSTEM

(75) Inventor: Seiichi Furuta, Anjo (JP)

(73) Assignee: DENSO CORPORATION, Kariya (JP)

( * ) Notice: Subject to any disclaimer, the term of this patent is extended or adjusted under 35 U.S.C. 154(b) by 454 days.

(21) Appl. No.: 11/285,746

(22) Filed: Nov. 23, 2005

(65) Prior Publication Data

US 2006/0212177 A1 Sep. 21, 2006

(30) Foreign Application Priority Data

Nov. 25, 2004 (JP) ............................. 2004-341161

(51) Int. Cl.
G01C 21/00 (2006.01)
(52) U.S. Cl. ....................... 701/200; 701/213
(58) Field of Classification Search ...... 701/1, 701/200
See application file for complete search history.

(56) References Cited

U.S. PATENT DOCUMENTS

| 6,442,475 | B1 | 8/2002 | Utsui et al. |
| 7,123,131 | B2 * | 10/2006 | Arai ......................... 340/425.5 |
| 7,216,120 | B2 * | 5/2007 | Yoshida et al. .................. 707/3 |
| 2003/0009567 | A1 * | 1/2003 | Farouk ........................ 709/229 |
| 2003/0029911 | A1 | 2/2003 | Kitayama |
| 2004/0205620 | A1 * | 10/2004 | Nishikori et al. ........... 715/523 |
| 2005/0027787 | A1 | 2/2005 | Kuhn et al. |
| 2005/0055154 | A1 * | 3/2005 | Tanaka et al. ............... 701/200 |

FOREIGN PATENT DOCUMENTS

| JP | 2000205887 | * | 7/2000 |
| JP | A-2001-211443 | | 8/2001 |
| JP | A-2002-244946 | | 8/2002 |
| JP | A-2003-58462 | | 2/2003 |
| JP | A-2003-316385 | | 11/2003 |
| JP | A-2004-30396 | | 1/2004 |

OTHER PUBLICATIONS

JP 2000205887 Translation.*
Office Action dated Jan. 4, 2008 in corresponding Chinese Patent Application No. 200510125507 (and English translation).

* cited by examiner

Primary Examiner—Thomas G Black
Assistant Examiner—Ce Li
(74) Attorney, Agent, or Firm—Posz Law Group, PLC

(57) ABSTRACT

An information service system includes a contents service provider for providing contents data of a content together with an application software for providing an informational service intended by the content, a service center for collecting the contents data and the application software provided by the contents service provider, and terminals of plural kinds coupled with the service center through communication. The service center includes an information service control means for providing the informational service suitable for the kind of the terminal by executing the application software collected from the contents service provider, and the terminal uses the informational service provided by the service center.

13 Claims, 5 Drawing Sheets

INFORMATION SERVICE SYSTEM

CROSS REFERENCE TO RELATED APPLICATION

This application is based on and claims the benefit of priority of Japanese Patent Application No. 2004-341161 filed on Nov. 25, 2004, the disclosure of which is incorporated herein by reference.

FIELD OF THE INVENTION

The present invention generally relates to an information service system for providing information that is suitable for a recipient of the information.

BACKGROUND OF THE INVENTION

In recent occurrence of technical development, a navigation system conventionally used independently as a single unit is connected to, for example, an information network for navigating a vehicle or similar purposes. Japanese Patent Document JP-A-2003-316385 discloses this type of vehicle navigation system.

However, an information receiving side of the information network includes various kinds of mobile devices, such as a personal computer (PC), a cellular phone, a personal digital assistance (PDA), and a display terminal of a navigation system. Therefore, the information suitably received by the personal computer does not necessarily fit into a cellular phone. That is, for example, a low resolution and a smaller size of a display on the cellular phone does not provide good usability to a user of the cellular phone. As a result, contents service provider (CSP) can not successfully provide a useful feature of the contents to the user of the information network. Further, the contents of the CSP are not equally adapted for the use in the mobile devices such as the display terminal of the navigation system or the like.

SUMMARY OF THE INVENTION

In view of the above-described and other problems, the present invention provides an information service system that provides suitably adapted information for a recipient of the contents of the information service system.

The information service system includes a contents service provider (CSP) for providing contents data of a content together with an application software for providing an informational service intended by the content, a service center for collecting the contents data and the application software provided by the contents service provider, and terminals of plural kinds coupled with the service center through communication. The service center includes an information service control means for providing the informational service suitable for the kind of the terminal by executing the application software collected from the contents service provider, and the terminal uses the informational service provided by the service center.

The information service system of the present invention provides the informational service suitable to the kinds of the terminals by executing the application software after separately collecting the contents data of the informational service from the contents service provider and the application software. In this manner, the physical restriction of the terminal that deteriorates usability and expressiveness of the content can be worked around and the informational service can be adapted to the kinds of the terminal on the receiving side of the content.

According to one aspect of the present invention, the service center of the information service system includes a terminal control means for managing terminal information, and the information service control means controls formation of the content based on the terminal information for providing the informational service to the terminal. In this manner, the content of the informational service is adapted to the characteristics of the terminal such as a size/resolution of the display, and/or the number/positions/types of the operation switches. As a result, the informational service are equally accessible in various terminals.

According to yet another aspect of the present invention, the terminal of the information service system is used in a vehicle for sending vehicle information to a service center, and the information service control means includes a control determination means for determining a control imposed on the informational service to be provided for the terminal in the vehicle based on the vehicle information. The information service control means provides the informational service with the control for the terminal in the vehicle when the control determination means determines the control imposed on the informational service. In this manner, the informational service not suitable for a driver of the vehicle will not be provided for the driver. For example, a TV program will not be provided for the driver while the vehicle is traveling.

According to still yet another aspect of the present invention, the terminal in the vehicle provides the vehicle information including a position of a display of the terminal in the vehicle, and the control determination means determines the control imposed on the informational service when the position of the display of the terminal is within a predetermined area for control imposition of the informational service. In this manner, the control of the informational service is determined according to the position of the display. That is, the control of the informational service is determined, for example, based on the use of the service by the driver of the vehicle.

According to still yet another aspect of the present invention, the information service control means provides informational service with and without the control based on the determination of the control determination means when the position of the display of the terminal includes plural positions within and outside of the predetermined area for the control imposition of the informational service. That is, the terminal in the vehicle provides the informational service with the control from the display positioned within the predetermined area, and the terminal in the vehicle provides the informational service without the control from the display positioned outside the predetermined area. In this manner, the display of the terminal mainly used by the driver of the vehicle can be designed to provide the informational service with the control, and the other display of the terminal used by the occupants in a rear seat can be designed to provide the information service without the control.

According to still yet another aspect of the present invention, the information service system includes a contents service provider for providing contents data of a content together with an application software for providing the information service intended by content, a service center for collecting the contents data and the application software provided by the contents service provider, and terminals of plural kinds with the service center through communication. The service center provides the application software collected from the contents service provider for the terminal, and the service center includes an information service control means for sending the application software collected from the contents service provider and controlling formation of the contents of the informational service so that the informational service suitable for the kind of the terminal is used when the application software is executed in the terminal. The terminal includes the application control means for executing the application software provided by the service center, and uses the informational service by executing the application software.

In this manner, the informational service suitable for the kinds of the terminal is provided for each kind of the terminals. Further, the latest application collected from the CSP can be provided for the terminal. As a result, a feature of an optional terminal of the vehicle that is installed by a manufacturer of the vehicle can be updated without changing a hardware in the vehicle.

According to still yet another aspect of the present invention, the service center includes a terminal control means for managing terminal information, and the information service control means controls formation of the content based on the terminal information. In this manner, the content of the informational service can be adapted for the kinds of the terminal used in the vehicle. As a result, the informational service is equally accessible through the various kinds of the terminals used in the vehicles.

According to still yet another aspect of the present invention, the terminal is used in a vehicle, and includes a vehicle information detection means for providing vehicle information, and the application control means includes a control determination means for determining a control imposed on the informational service based on the vehicle information. The informational service receives the control when the control determination means determines the control for the informational service. In this manner, the control on the informational service is determined based on the condition of the vehicle. For example, the control is imposed on the informational service when the vehicle is not in a suitable condition, e.g., in a high speed traveling on a road or the like.

According to still yet another aspect of the present invention, the vehicle information includes a position of a display of the terminal in the vehicle, and the control determination means determines the control imposed on the informational service when the position of the display of the terminal is within a predetermined area for control imposition. In this manner, the control for the informational service is determined based on the position of the display of the terminal in the vehicle. For example, the control of the informational service is determined suitably for the driver of the vehicle when the position of the display is intended for the driver.

According to still yet another aspect of the present invention, the application control means provides informational service with and without the control based on the determination of the control determination means when the position of the device display of the terminal includes plural positions within and outside of the predetermined area for the control imposition of the informational service, and the terminal in the vehicle provides the informational service with the control from the display positioned within the predetermined area for the control imposition. The terminal in the vehicle provides the informational service without the control from the display positioned outside the predetermined area for the control imposition. In this manner, the display of the terminal mainly used by the driver of the vehicle can be designed to provide the informational service with the control, and the other display of the terminal used by the occupants in the rear sheet can be designed to provide the information service without the control.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

A first embodiment of an information service system of the present invention is described with reference to the drawings.

Figure 1:
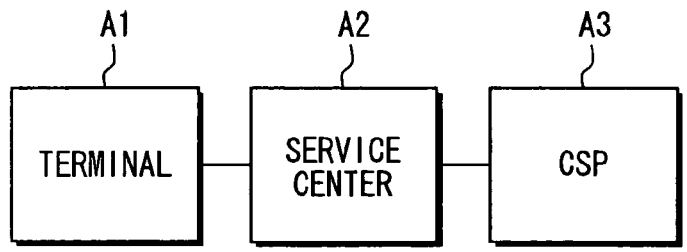
FIG. 1 shows a block diagram of a basic scheme of an information service system in a first embodiment of the present invention.

FIG. 1 shows a block diagram of a basic scheme of an information service system in the first embodiment. A terminal A1 includes, for example, a mobile terminal of different kinds such as a cellular phone, a PDA, a car navigation system in a vehicle or the like. In this embodiment, the terminal A1 is presumed to be a car navigation system. The information service system provides various types of information to occupants of the vehicle.

The terminal A1 of the information service system is connected to a service center A2 and contents service providers (CSPs) A3 through the information service system. The service center A2 is connected to the CSPs A3 that provides various types of services through a communication network such as the Internet or the like.

The terminal A1 is connected to the service center A2 through a wired/wireless communication, and exchanges various types of data with the service center A2. The terminal A1 is capable of executing a certain operation while the wireless communication with the service center A2 is blocked.

The terminal A1 is capable of handling a provided service under instruction by a user's voice. This capability enables a driver of the vehicle to handle the provided service without interrupting a driving operation.

Figure 2:
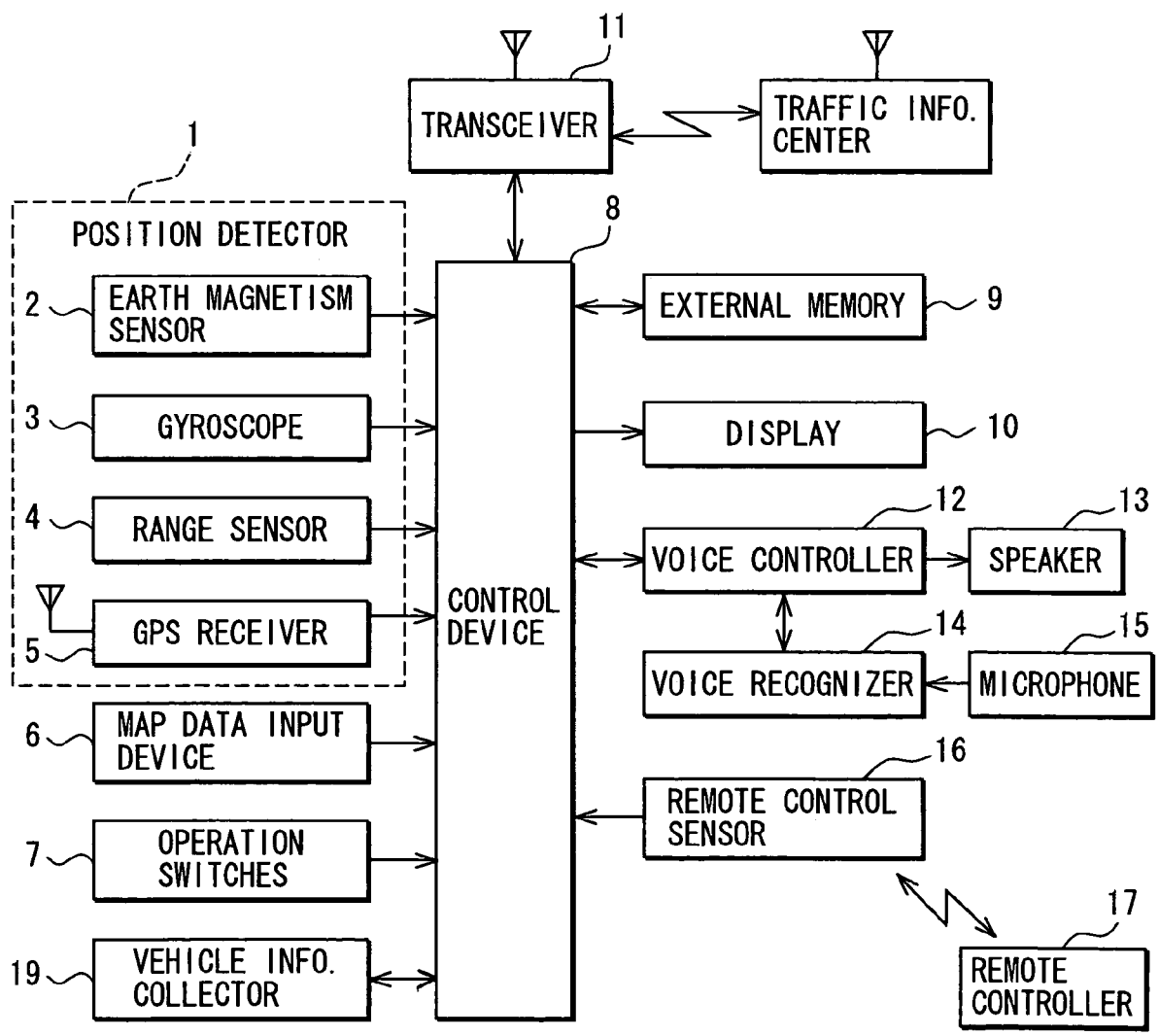
FIG. 2 shows a block diagram of a car navigation system as a terminal of the information service system.

FIG. 2 shows a block diagram of a car navigation system as a terminal A1 of the information service system. The car navigation system includes a position detector 1, a map data input device 6, operation switches 7, an external memory 9, a display 10, a transceiver 11, a voice controller 12, a speaker 13, a voice recognizer 14, a microphone 15, a remote control sensor 16, a remote controller 17, a vehicle information collector 19, and a control device 8 for controlling the above-described device.

The control device 8 executes predetermined processes such as, for example, a map scale change process, a menu item selection process, a destination setting process, a route search process, a route guidance start process, a current position correction process, a display change process, a volume change process and the like based on various kinds of information inputted from the position detector 1, the map data input device 6, the operation switches 7, the external memory 9, the transceiver 11, the voice controller 12, and the remote control sensor 16.

The position detector 1 includes well-known types of devices such as an earth magnetism sensor 2, a gyroscope 3, a range sensor 4, a global positioning system (GPS) receiver 5 that receives a radio wave from a satellite for determining a current position of the vehicle. These sensors complement measurement errors of different natures with each other. The accuracy of the measurement may be secured by using part of the sensors described above, or may be complemented by using a steering angle sensor, a wheel sensor or the like.

The map data input device 6 includes a memory (not shown in the figure) for storing inputted various kinds of data including data for, for example, map matching, map display, and landmark display. The memory for the map data input device includes a CD-ROM, a DVD-ROM, a memory card, a hard disk drive (HDD) and the like.

The operation switches 7 includes a touch switch that is integrated with the display 10, or a mechanical switches. The operation switches 7 is used for giving instruction of various functions such as a map scale change function, a menu item selection function, a destination setting function, a route search function, a route guidance start function, a current position correction function, a display change function, a volume change function, or the like.

The remote controller 17 has a plurality of switches (not shown in the figure) for inputting instruction of various signals through the remote control sensor 16 to the control device 8. The operation switches 7 and the remote controller 17 are both capable of executing a same function of the control device 8 with operation of the switch.

A destination inputted from he remote controller 17 or the operation switches 7 is received by the control device 8 and used for an optimum route search from a current position of the vehicle detected by the position detector 1 to the destination. The searched route by using an algorithm such as Dijkstra method is displayed on the display 10 with a current position mark on a map. The map on the display 10 may include other information such as a current time, a traffic jam information or the like.

The external memory 9 includes the HDD that is used for storing a large amount of data. The external memory 9 stores data that has to be retained while the system power is turned off, the large amount of data, or the data copied from the map data input device 6 for frequent use. The external memory 9 may be a removable memory having a small amount of capacity.

The display 10 is used for displaying the map, a menu screen, and the like. The display 10 displays the contents in a full range of colors, and uses a device such as a liquid crystal device, an organic electro-luminescence device or the like.

The transceiver 11 receives various information such as a traffic information or information sent out from the service center A2. The transceiver provides vehicle information including a vehicle speed, a position of a gear, a position of a parking brake and the like. The vehicle information includes a position of the display 10 (front/rear), user information of the terminal A1 (a user ID, a password, a name, a vehicle type and the like).

The speaker is used for transmitting a predetermined voice guidance such as a guidance for the display screen operation, a result of a voice recognition, or the like based on a signal input from the voice controller 12. The microphone 15 is used for providing the voice of the user as an electronic signal to the voice recognizer 14. The voice recognizer 14 compares the user's voice inputted from the microphone 15 and voice patterns stored in a recognition dictionary (not shown in the figure) for recognizing the voice as an instruction for the voice controller 12.

The voice controller 12 controls the voice recognizer 14, and controls a talk back (sound output) to the user who inputted the voice through the speaker. The voice controller 12 also inputs a recognition result of the voice recognizer 14 to the control device 8.

The vehicle information collector 19 collects vehicle information described above, and outputs the collected information to the control device 8.

The control device 8 executes the processes such as, for example, a map scale change process, a menu item selection process, a destination setting process, a route search process, a route guidance start process, a current position correction process, a display change process, a volume change process and the like based on the information from the voice recognizer 14. The route guidance voice and the like processed in the control device 8 is appropriately outputted from the speaker 13 through the voice controller 12. The control device 8 vehicle information described above to the service center A2.

Figure 3:
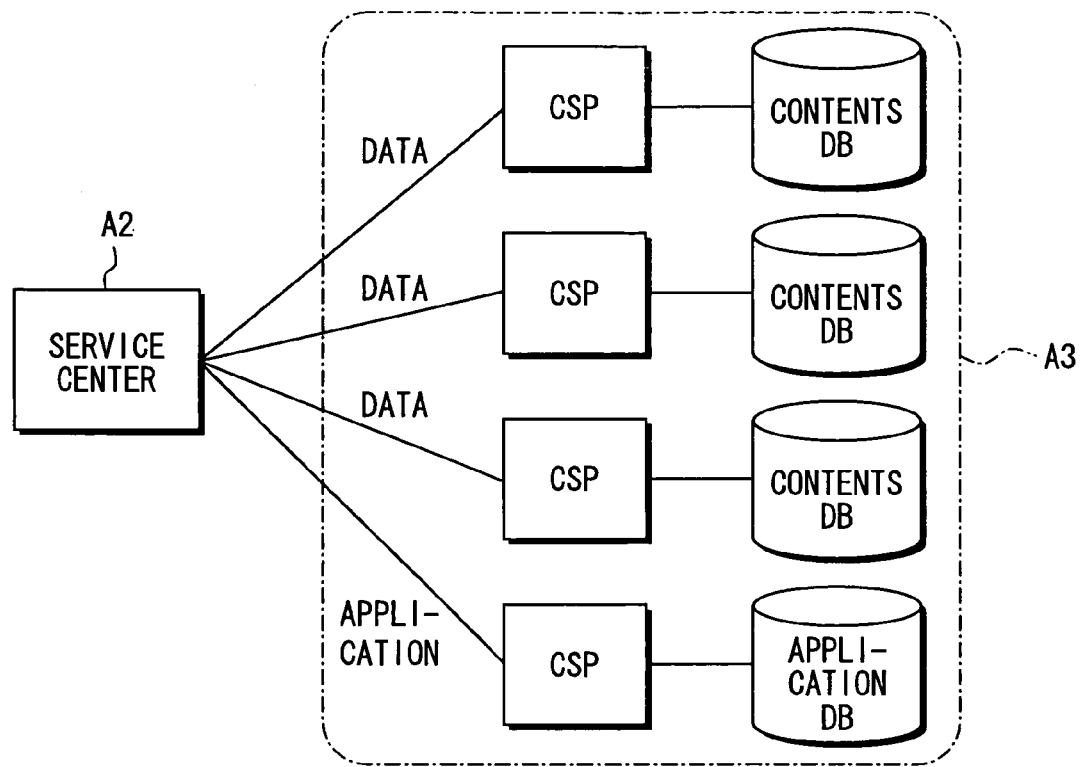
FIG. 3 shows a block diagram of a basic scheme of contents service providers (CSPs) in a group in the first embodiment.

FIG. 3 shows a block diagram of a basic scheme of contents service providers (CSPs) group A3 in the first embodiment. The CSPs group A3 includes a plurality of CSPs, and each CSP includes two separate databases, that is, a contents database (contents DB) for providing contents and an application database (application DB) for providing an application software that is used for an informational service. The informational service includes services such as, for example, an e-mail transmission service, a traffic information service, a weather information service, a travel information service (including a transfer and a reservation), an entertainment information service (a music download or the like) and the like. Each CSP provides the contents and the application software separately to the service center A2. The application software is designed to be executed in the service center A2.

Figure 4:
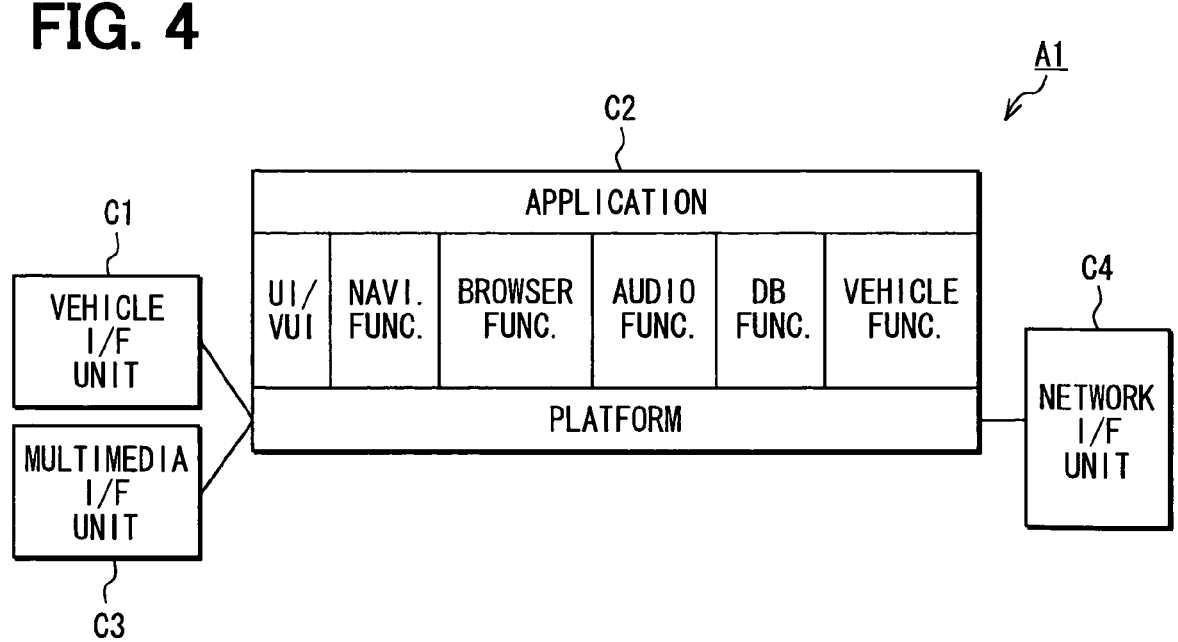
FIG. 4 shows a block diagram of a basic hierarchical structure of the terminal.

FIG. 4 shows a block diagram of a hierarchical structure of the terminal A1. The terminal A1 includes a vehicle interface (vehicle I/F) unit C1 used for communication with a vehicle, an application control unit C2 for executing the application software, a multimedia interface unit C3 used for communication with an audio system or the like, and a network interface unit C4 used for communication with an external device.

A platform of the application control unit C2 is a combination of, for example, a hardware, a device driver, an operating system (OS) and the like. The platform supports functions such as a user interface (UI) function, a voice user interface (VUI) function, a navigation function that enables the operation of a navigation system, and a browser function that displays a home page on the Internet. The platform also includes an audio function for the operation of an audio system, a database (DB) function for data storage/retrieval and execution of the application software, and vehicle function for collecting the vehicle information. These functions are available for the user by executing the application program.

Figure 5:
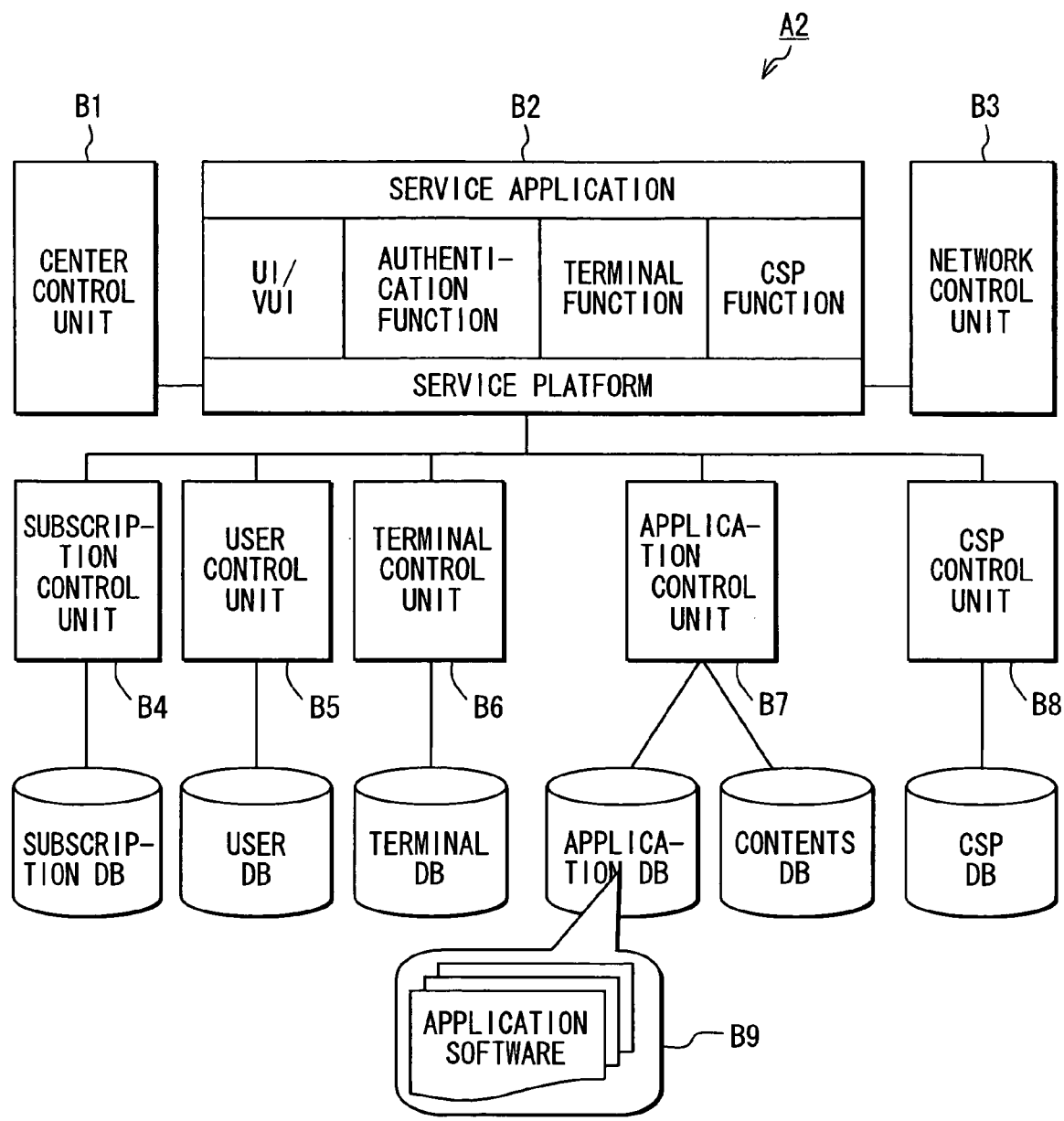
FIG. 5 shows a block diagram of a hierarchical structure of a service center.

FIG. 5 shows a block diagram of a hierarchical structure of the service center A2. The service center A2 includes a center control unit B1, a information service control unit B2 for providing the informational service to the terminal A1 through execution of the application software collected from the CSPs A3, the network control unit B3 for controlling communication with the network, a subscription control unit B4 for providing a charged content to the user of the terminal A1, and a user control unit B5 for controlling information on the user of the terminal A1.

The service center A2 also includes a terminal control unit B6 for controlling information (e.g., a display size, a display resolution, the number/position/types of operation keys) on the various terminals A1 including a PC, a cellular phone, a PDA, a car navigation system and the like, an application control unit B7 for separately controlling the contents data and the application software B9 collected from the CSPs A3, and a CSP control unit B8 for controlling information on the CSPs A3.

A service platform in the information service control unit B2 is, for example, a combination of the hardware, the device driver, the operating system and the like. The service platform supports functions such as a user interface (UI) function, a voice user interface (VUI) function, an authentication function for authenticating the user, a terminal function for adapting a form of the contents based on the information controlled by the terminal control unit B6, and a CSP function for providing the informational service through execution of the application software by using the adapted contents. Each of the above-described functions are provided by executing a service application program.

The information service system of the first embodiment separately collects the contents and the application software from the CSPs A3. Then, the information service system provides the contents prepared by the CSPs to the terminal A1 by executing the application software in the service center A2 after adapting the form of the contents based on the information controlled by the terminal control unit B6. In this manner, the contents of the informational service is adaptively provided to the type of the terminal A1.

The information service system in the first embodiment can work around the physical restriction of the terminal that deteriorates usability and expressiveness of the content when the contents of the informational service is adaptively modified to the terminal A1 based on the information on the terminal type. As a result, the informational service is equally accessible by the terminals A1 of each kind.

Further, the terminal function determines whether informational service for the terminal A1 should have a control imposed thereon based on the vehicle information on the terminal A1, and provides the controlled informational service to the terminal A1 as a result of a contents control process.

The contents control process is described with reference to flowcharts in FIGS. 6 and 7.

Figure 6:
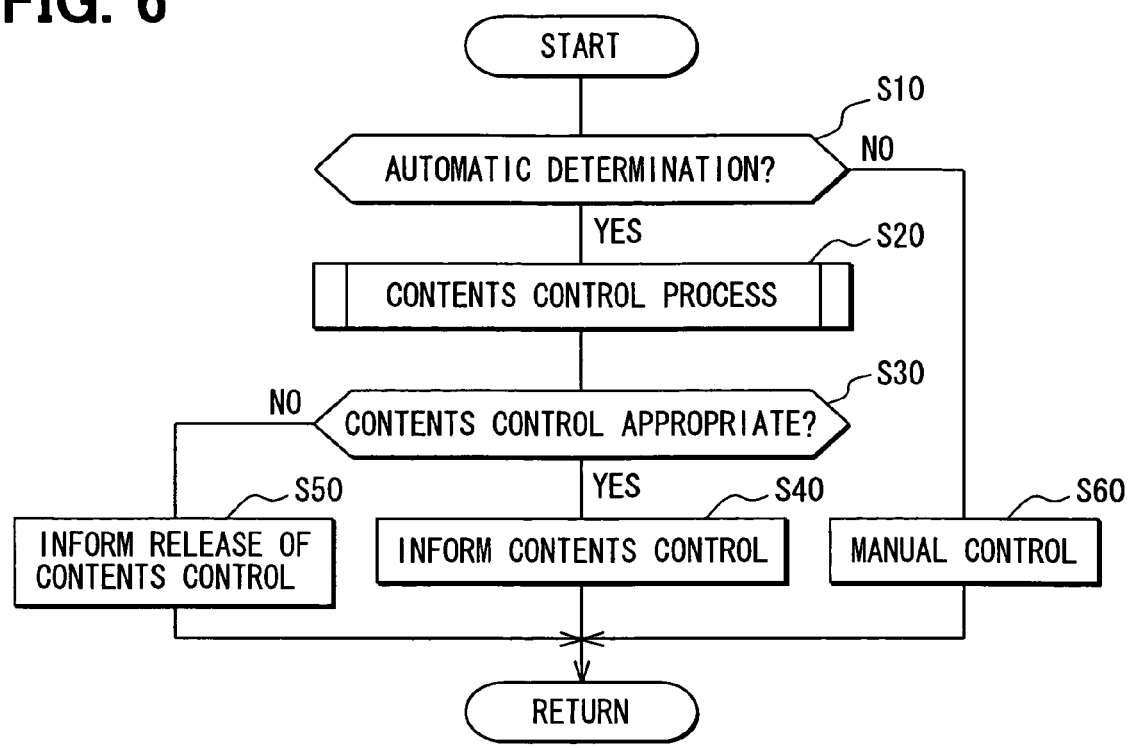
FIG. 6 shows a flowchart of a contents control process executed in the service center A2.
Figure 7:
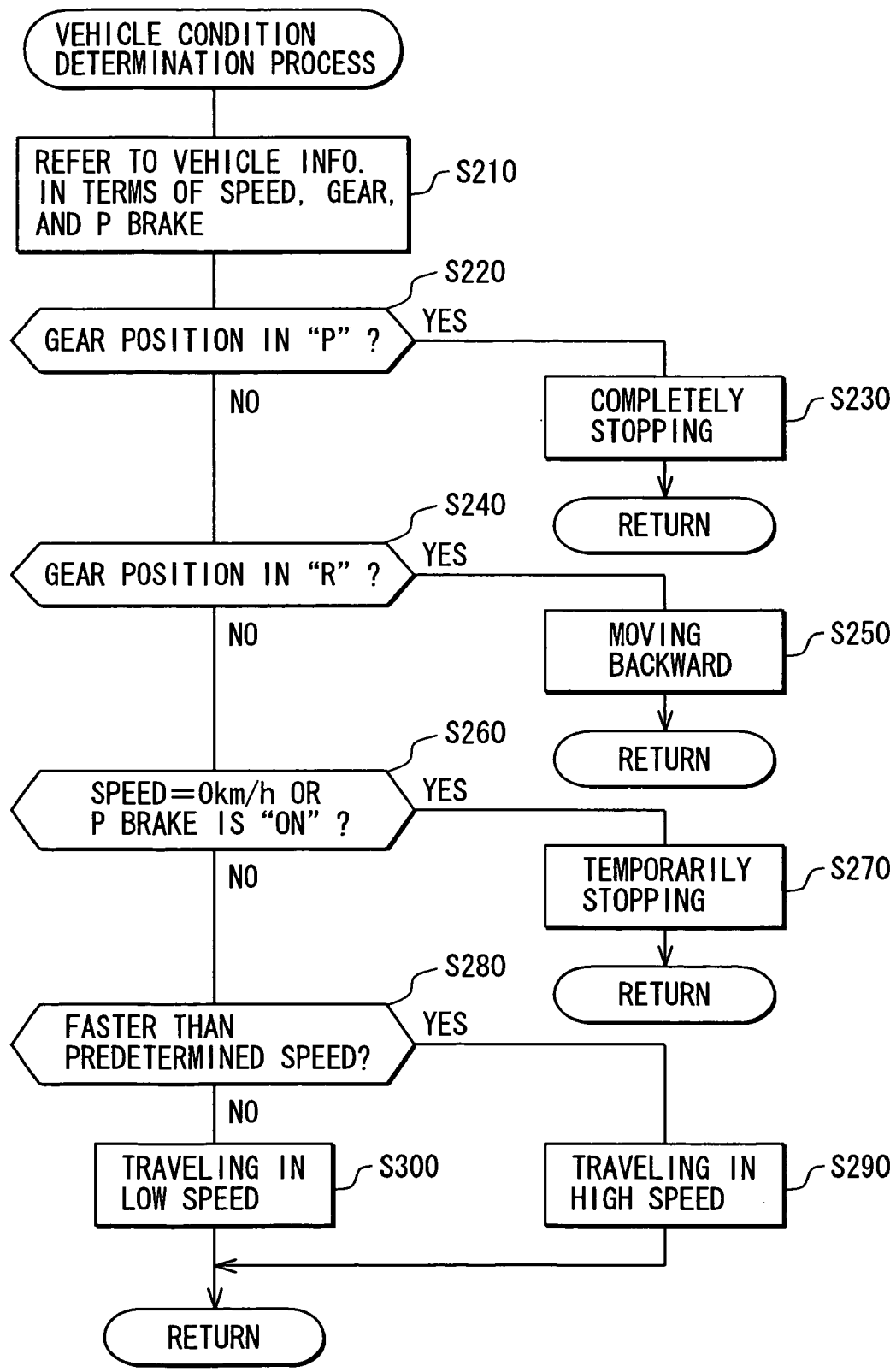
FIG. 7 shows a flowchart of a vehicle condition determination process in the contents control process.

In step S10 in FIG. 6, a process of the contents control process determines whether the control on the informational service is provided automatically based on the vehicle information. The process proceeds to step S20 when step S10 is determined as YES, and the process proceeds to step S60 when step S10 is determined as NO. In step S60, the informational service is manually controlled in terms of the control imposed on the informational service.

In this case, the automatic determination of the control is initially turned on by the user. However, the automatic determination of the control may be turned on when the terminal A1 is a terminal of the car navigation system.

A vehicle condition determination process in step S20 is described with reference to a flowchart in FIG. 7.

In step S210, the vehicle information is analyzed in terms of the speed of the vehicle, the position of the gear and the position of the parking brake.

In step S220, the position of the gear is determined if it is in a P (Parking) position. The process proceeds to step S230 when it is determined as YES, that is, the vehicle is determined to be in a complete stop condition before returning to the contents control process. The process proceeds to step S240 when it is determined as NO.

In step S240, the position of the gear is determined if it is in an R (Reverse) position. The process proceeds to step S250 when it is determined as YES, that is, the vehicle is determined to be moving backward before returning to the contents control process. The process proceeds to step S260 when it is determined as NO.

In step S260, the process determines if the vehicle speed is equal to 0 km/h or the position of the P brake is ON (i.e., the parking brake is in operation). The process proceeds to step S270 when either of the two condition is YES, that is, the vehicle is determined to be temporarily stopping before returning to the contents control process. The process proceeds to step S280 when it is determined as NO.

In step S280, the process determines if the vehicle is traveling faster than a predetermined speed. The process proceeds to step S290 when it is determined as YES, that is, the vehicle is traveling in high speed before returning to the contents control process. The process proceeds to step S300 when it is determined as NO. In step S300, the vehicle is determined to be traveling in low speed before returning to the contents control process.

In step S30 in FIG. 6, the vehicle condition is determined if the contents control is appropriate based on the result of the vehicle condition determination process in step S20. The process proceeds to step S40 for imposing the control on the informational service when the result of the vehicle condition determination process in step S20 is either of the following, that is, the vehicle is traveling in high/low speed, or the vehicle is moving backward.

In step S40, the vehicle condition changed from no control imposed on the informational service to a controlled condition is notified to the user of the terminal A1. In this manner, the user of the terminal A1 can recognize the informational service restricted by the control imposed thereon.

The process proceeds to step S50 for not imposing the control on the informational service when the result of the vehicle condition determination process in step S20 is either of the following, that is, the vehicle is in the complete stop condition, or the vehicle is temporarily stopping. In step S50, the vehicle condition changed from the control imposition to no control imposition on the informational service is notified to the user of the terminal A1. In this manner, the user of the terminal A1 can recognize the informational service being released from the control imposed thereon.

The informational service provided to the terminal A1 from the service center A2 may be restricted when the condition of the driver of the vehicle is not suitable for receiving the contents of the informational service, that is, when the vehicle is traveling. In this manner, each CSP can concentrate on the contents of the informational service without paying attention to the contents control process.

The contents control process may be controlled based on the vehicle information on the position of the display 10 in the terminal A1. That is, the contents of the informational service may be restricted when the display 10 is disposed for the driver of the vehicle in a proximity of the driver's seat. In this manner, the restriction on the contents of the informational service can suitably be determined according to the position of the display 10.

When the displays 10 are disposed both in and outside a predetermined area for contents restriction and the contents control process in step S30 is determined to be appropriate, the informational service with and without the control are respectively provided to the displays 10 of the terminal A1. That is, the display 10 in the predetermined area for restriction may provide the contents of the informational service with the control, and another display 10 not in the predetermined area for contents restriction may provide the contents of the informational service without the control.

In this manner, the display 10 in a front (driver's) seat and the display 10 in a rear seat can provide controlled contents and not-controlled contents of the informational service respectively for the user of the service.

Second Embodiment

A second embodiment is similar to the first embodiment, and thus the common part in both embodiments are omitted from the following description.

In the second embodiment of the present invention, the application software of the informational service prepared by the CSPs A3 are intended to be executed on the terminal A1, and the contents of the informational service is distributed from the service center A2 to the terminal A1. That is, the application software is executed on the terminal A1 instead of the service center A2 in the second embodiment.

The contents of the informational service and the application software are separately collected by the service center A2, and then are distributed to the terminal A1. The contents of the informational service are adapted to each of the terminal before distribution.

Figure 8:
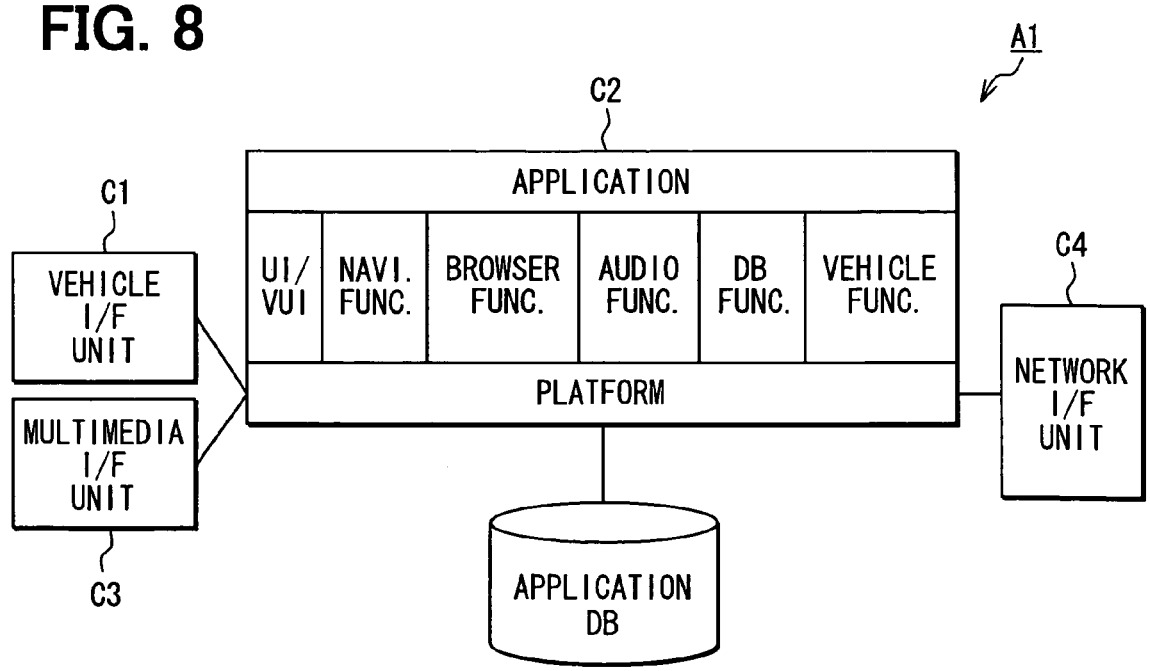
FIG. 8 shows a block diagram of the basic hierarchical structure of the terminal A1 in a second embodiment.

FIG. 8 shows a block diagram of the hierarchical structure of the terminal A1. The difference of the structure from the first embodiment is that the terminal in this embodiment has an application database (application DB). The application software distributed from the service center A2 is stored in the application DB. The application software is executed so that the user can have access to the informational service.

The informational service provided to the terminal A1 is adapted to the kinds of the terminal in the above described manner, and thereby ensuring equal accessibility to the user of each terminal A1. Further, a latest application software can distributed and used in the terminal A1. As a result, a feature of an optional terminal of the vehicle that is installed by a manufacturer of the vehicle can be updated without changing a hardware in the vehicle.

In addition, the contents control process is executed in the terminal A1 in this embodiment. That is, analysis and determination of the vehicle information whether the contents of the informational service should be controlled or not are conducted in the terminal A1. In this manner, the contents of the informational service is controlled according to the condition of the vehicle.

The contents control process may be controlled based on the vehicle information on the position of the display 10 in the terminal A1. That is, the contents of the informational service may be restricted when the display 10 is disposed for the driver of the vehicle in a proximity of the driver's seat. In this manner, the restriction on the contents of the informational service can suitably be determined according to the position of the display 10.

When the displays 10 are disposed both in and outside a predetermined area for contents restriction and the contents control process is determined to be appropriate, the informational service with and without the control are respectively provided to the displays 10 of the terminal A1. That is, the display 10 in the predetermined area for contents restriction may provide the contents of the informational service with the control, and another display 10 not in the predetermined area for contents restriction may provide the contents of the informational service without the control.

In this manner, the display 10 in a front (driver's) seat and the display 10 in a rear seat can provide controlled contents and not-controlled contents of the informational service respectively for the user of the service.

Although the present invention has been fully described in connection with the preferred embodiment thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. An information service system comprising:

a contents service provider for providing contents data of a content together with an application software for providing an informational service intended by the content;

a service center located outside a vehicle and for collecting the contents data together with the application software provided by the contents service provider; and one of terminals of plural kinds used in the vehicle and coupled with the service center through a wireless communication configured to receive the informational service, wherein the terminal includes a vehicle information detection means for detecting vehicle information including a viewability of the terminal and a vehicle traveling condition, the terminal being configured to send the vehicle information to the service center, the service center includes a terminal control means for managing terminal information indicating a kind of the terminal, the service center further includes an information service control means for executing the application software and configured to adaptively modify a form of the content suitable for the kind of the terminal based on the terminal information before providing the informational service, the service center further includes a control determination means configured to determine a control, which is specific to the vehicle information and to be imposed on the informational service to be provided, based on the vehicle information, the informational service control means provides the informational service with the control when the control determination means determines the control is to be imposed, the service center restricts the information service from being provided when the vehicle traveling condition indicates that the driver of the vehicle is not suitable for receiving the contents when both of the following conditions are not satisfied: the vehicle speed is equal to 0 km/h, and the position of a parking brake is ON, and the terminal is a car navigation system.

2. The information service system according to claim 1, wherein the terminal in the vehicle provides the vehicle information including a position of a display of the terminal in the vehicle; and the control determination means determines the control imposed on the informational service when the position of the display of the terminal is within a predetermined area for control imposition of the informational service.

3. The information service system according to claim 2, wherein the information service control means provides informational service with and without the control based on the determination of the control determination means when the position of the display of the terminal includes plural positions within and outside of the predetermined area for the control imposition of the informational service, the terminal in the vehicle provides the informational service with the control from the display positioned within the predetermined area for the control imposition, and the terminal in the vehicle provides the informational service without the control from the display positioned outside the predetermined area for the control imposition.

4. The information service system of claim 1, wherein the form of the content is adaptively modified at the information service control means in the service center, prior to the terminal receiving the informational service, to suit different characteristics of different plural kinds of terminals, the different characteristics including the size of the display, the resolution of the display, the number of operation switches, the positions of the operation switches and the types of the operation switches.

5. The information service system of claim 1, wherein the plural kinds of the terminals include a PC, a cellular phone, a PDA, a car navigation system, wherein the form of the content is adaptively modified at the information service control means in the service center, prior to the terminal receiving the informational service, to suit different characteristics of different plural kinds of terminals, the different characteristics including the size of the display, the resolution of the display, the number of operation switches, the positions of the operation switches and the types of the operation switches.

6. The information service system according to claim 1, wherein the vehicle traveling condition indicates that the driver of the vehicle is not suitable for receiving the contents when the position of a display of the terminal is in a proximity of a driver's seat.

7. An information service system comprising:

a contents service provider for providing contents data of a content together with an application software for providing an informational service intended by the content;

a service center located outside a vehicle and for collecting the contents data together with the application software provided by the contents service provider; and terminals of plural kinds used in the vehicle and coupled with the service center through a wireless communication configured to receive the informational service, wherein the service center provides the application software collected from the contents service provider for the terminal, the terminal includes an application control means for executing the application software provided by the service center, and the terminal is configured to receive the informational service by executing the application software, the terminal is used in a vehicle and includes a vehicle information detection means for providing vehicle information, the service center being remote from the vehicle, the service center includes an information service control means for sending the application software collected from the contents service provider and controlling a format of the contents of the informational service so that the informational service suitable for the kind of the terminal is used when the application software is executed in the terminal, the application control means includes a control determination means for determining a control to be imposed on the informational service based on the vehicle information indicating a viewability of the terminal in the vehicle, the service center includes a terminal control means for managing terminal information, the information service control means adaptively modifies the form of the contents based on the terminal information indicating a kind of the terminal, the informational service receives the control when the control determination means determines the control for the informational service, the vehicle information indicating a viewability of the terminal includes the vehicle traveling condition and a position of a display of the terminal in the vehicle, the control determination means determines the control imposed on the informational service when the position of the display of the terminal is within a predetermined area for control imposition of the informational service and the vehicle traveling condition indicates that the driver of the vehicle is not suitable for receiving the contents of the informational service, and the terminal is a car navigation system.

8. The information service system according to claim 7, wherein the vehicle information includes a position of a display of the terminal in the vehicle; and the control determination means determines the control imposed on the informational service when the position of the display of the terminal is within a predetermined area for control imposition.

9. The information service system according to claim 8, wherein the application control means provides informational service with and without the control based on the determination of the control determination means when the position of the device display of the terminal includes plural positions within and outside of the predetermined area for the control imposition of the informational service, the terminal in the vehicle provides the informational service with the control from the display positioned within the predetermined area for the control imposition, and the terminal in the vehicle provides the informational service without the control from the display positioned outside the predetermined area for the control imposition.

10. The information service system of claim 7, wherein the form of the content is adaptively modified at the information service control means in the service center, prior to the terminal receiving the informational service, to suit different characteristics of different plural kinds of terminals, the different characteristics including the size of the display, the resolution of the display, the number of operation switches, the positions of the operation switches and the types of the operation switches.

11. The information service system of claim 7, wherein the plural kinds of the terminals include a PC, a cellular phone, a PDA, a car navigation system, wherein the form of the content is adaptively modified at the information service control means in the service center, prior to the terminal receiving the informational service, to suit different characteristics of different plural kinds of terminals, the different characteristics including the size of the display, the resolution of the display, the number of operation switches, the positions of the operation switches and the types of the operation switches.

12. The information service system according to claim 11, wherein the traveling condition indicates that the vehicle is traveling when the vehicle speed is equal to 0 km/h or the position of a parking brake is ON.

13. The information service system according to claim 12, wherein
the terminal is a car navigation system, and
the service center restricts the contents from being provided when a position of a display of the terminal is in a proximity of a driver's seat.

* * * * *